United States Patent Office 2,695,517
Patented Nov. 30, 1954

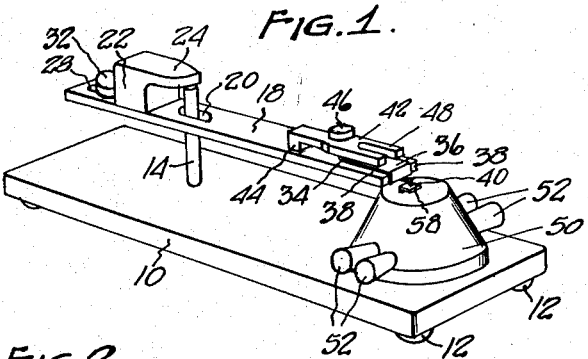

2,695,517

DEVICE FOR MEASURING COMPLIANCE OF MECHANICAL STRUCTURES TO MOTION

Alpha M. Wiggins, Clay Township, St. Joseph County, Ind., assignor to Electro Voice, Inc., Buchanan, Mich., a corporation of Indiana Application April 14, 1950, Serial No. 155,900

4 Claims. (Cl. 73—67)

This invention relates generally to a device for measuring compliance of mechanical structures to motion, that is, to a device for measuring the mechanical compliance of vibrating and flexible systems, such as armatures, diaphragms, suspensions, and sound translating devices, such as phonograph pickups.

The development of phonograph pickups and various types of stylii used therein and the low needle force which is required to insure against the provision of excessive wear on the stylus point and on the groove of a phonograph record, have made it necessary to design phonograph pickups with greater compliance than was necessary heretofore. Also other types of vibrating systems from time to time present problems entailing the measurement of the compliance thereof, and as a result of these conditions there has arisen a need for a device for quickly and expeditiously measuring compliance.

It is the primary object of this invention to satisfy that need by providing a compliance meter which is simple to construct, easy to use, and by means of which a direct reading of compliance can be secured.

A further object is to provide a device of this character having a cantilever vibrating member which serves as the armature of a magnetic driving system and with which is associated for actuation a voltage generator which will develop a voltage proportional to the displacement of the vibratory element. The vibratory element will have a predetermined response to vibration upon actuation of the magnetic driving system, and, when the unit to be tested is associated with the vibratory member in a manner to transmit vibration from one to the other, the stiffness of the member being tested will be added to the stiffness of the vibratory member so that the vibratory member will vibrate with a different or decreased amplitude due to the added stiffness of the member being tested.

A further object is to provide a device of this character in which a vibrating member is adapted to be vibrated at any selected frequency, which frequency is adapted to be somewhat retarded dependent upon the stiffness of the member whose compliance is to be measured, and which vibrating member serves to actuate a voltage generating device whose output voltage is measured and calibrated in terms of measurement of compliance.

Other objects will be apparent from the following specification.

In the drawing:

Fig. 1 is a perspective view illustrating one embodiment of this invention adapted particularly for use in measuring the compliance of a phonograph pickup.

Fig. 2 is a side view of the device shown in Fig. 1 with parts thereof shown in longitudinal vertical section.

Fig. 3 is a part-sectional and part-schematic view illustrating the construction of a part of the measuring device.

Fig. 4 is a mechanical circuit of the vibrating system.

Fig. 5 is a mechanical circuit of the vibrating system illustrating a stiffness load added for the purpose of effecting a measurement.

The compliance meter has a vibrating system which is composed of a cantilever reed which serves as the armature of a magnetic driving system. A voltage generating device, such as a piezoelectric element is associated with the reed in a manner such that a voltage is developed which is proportional to the displacement of the reed. The element whose compliance is to be measured is associated with the vibrating reed in such manner as to have transmitted thereto the vibrations existing within the reed. The vibrating system includes means, such as an electromagnetic coil under the influence of an oscillator for applying to the reed an alternating force causing the reed to vibrate with a velocity of $$v = f/Z_m \quad (1)$$

where $v$ is the velocity in centimeters per second, $f$ the force in dynes, and $Z_m$ the mechanical impedance in mechanical ohms.

The mechanical circuit of such a system is illustrated in Fig. 4. It is a simple series circuit composed of the mass $M$ of the reed, the compliance $C_R$ of the reed, and the mechanical resistance $R$ of the reed. The force required to overcome the reactance of the compliance is $f_c$.

When a lateral stiffness load, such as the load imposed by the member whose compliance is to be measured, for example, the stylus of the phonograph pickup, is applied to the reed, the stiffness at the stylus point will be added to the stiffness of the reed and the reed will vibrate with a different amplitude due to the added stiffness of the stylus. The mechanical circuit of the system, so loaded, is shown in Fig. 5. The resistance of the system is neglected in Fig. 5 as it is quite small.

When the system is vibrating with no load applied, the compliance to be measured $C_x$ is shorted at $S$ in the circuit diagram. When the load is applied, the short is removed from $C_x$. From the mechanical circuit under no-load conditions, the following condition exists:

$$f_c = \frac{f\frac{1}{jwC_R}}{jwM + \frac{1}{jwC_R}} \quad (2)$$

where $f_c$ is the force required to overcome the stiffness of the reed under no-load conditions, $C_R$ is the compliance of the reed, $M$ is the equivalent mass of the reed, and $W = 2\pi f$ (where $f$ is the frequency). Under loaded conditions $$f'_c = \frac{f\frac{1}{jwC_R}}{jwM + \frac{1}{jwC_R} + \frac{1}{jwC_x}} \quad (3)$$

where $f'_c$ is the force required to overcome the stiffness of the reed under loaded conditions. Combining these two equations, $$\frac{1}{jwC_x} = \left[jwM + \frac{1}{jwC_R}\right]\frac{f_c - f'_c}{f'_c} \quad (4)$$

$$C_x = \frac{f'_c}{f_c - f'_c}\left[\frac{C_R}{1 - w^2MC}\right] \quad (5)$$

For frequencies well below the resonant frequency $$1 \gg W^2 MC \quad (6)$$

and the equation reduces to $$C_x = \frac{f'_c C_R}{f_c - f'_c} \quad (7)$$

The voltage generator generates a voltage proportional to the displacement, and the displacement is proportional to $f_c$ and $f'_c$ $$e_0 \propto f_c \text{ and } e_L \propto f'_c \quad (8)$$

where $e_0$ is the voltage generated under no-load conditions and $e_L$ is the voltage generated under loaded conditions. The unknown compliance $C_x$ may now be written as $$C_x = \frac{e_L C_R}{e_0 - e_L} \quad (9)$$

The compliance $C_R$ of the reed may be determined by applying a known compliance such as a cantilever reed as a load. The compliance of a cantilever reed may be calculated by $$C = \frac{4L^3}{E_b c^3} \quad (10)$$

where C is the compliance in centimeters per dyne, L is the length in centimeters, b is the width in centimeters, c is the thickness in centimeters, and E is the modulus. The compliance $C_R$ of the reed can now be determined by $$C_R = C \left[ \frac{e_0 - e_L}{e_L} \right] \quad (11)$$

To measure compliance, the driving coil of the compliance meter is connected to an oscillator. The measurement should be made at a frequency above the resonance of the article carrier and the article whose compliance is being measured, and well below the resonance of the vibrating reed of the compliance meter.

The terminals of the voltage generator are connected across a vacuum-tube voltmeter of at least 0.5 megohm input impedance. The output of the oscillator may be set so that the vacuum-tube voltmeter reads full scale when no load is applied.

When a stiffness load is applied the meter will read less than full scale by an amount depending on the ratio of the stiffness of the load to the stiffness of the reed. By the use of Eq. 9 the meter may be calibrated in centimeters per dyne.

When a measurement is desired at a frequency above about one third the resonant frequency of the reed, the mass of the reed must be considered and Eq. 5 used. A measurement should never be made at a frequency within 100 cycles of the resonance of the reed, as the resistance of the system would then have to be considered.

The effective mass of a member, such as a phonograph tone arm, may be determined by placing the tone arm on the vibrating system so that the point of contact is at the same position as the stylus would be and measuring the resonant frequency of the system by observing the voltage maximum on the meter. The effective mass of the tone arm may then be calculated from $$M = \frac{1}{4\pi^2 f_0^2 C_R} \quad (12)$$

where M is the effective mass of the tone arm and $f_0$ is the resonant frequency of the system.

Care should be taken that the vibrating reed is parallel to the axis of the pickup cartridge when a measurement is made. The reed should not be driven at a displacement high enough to produce rattles or too great nonlinear distortion.

One embodiment of the invention has been chosen for illustration herein, which embodiment is particularly well suited for use in measuring the compliance of a phonograph pickup. The device comprises a base panel 10 which may be supported upon foot members or pads 12 and which is preferably of elongated character as illustrated. Adjacent one end the base 10 fixedly mounts a rigid vertical shaft 14 whose upper end portion 16 is preferably conical and terminates in a point.

A carrier or arm structure is supported in elevated position above the base by means of the shaft 14 and comprises a rigid elongated metal bar or plate 18 of a length preferably shorter than the length of the base 10. This bar has an elongated opening 20 therein intermediate its ends and of a size adapted to fit freely around the pin 14 with clearance. A rigid member 22 projects upwardly from the plate 18 adjacent one end of the slot 20 and terminates in an integral rigid plate portion 24 spaced from and substantially parallel to the plate 18 and substantially overlying the slot 20. The bottom surface of the part 24 at a point substantially aligned with the center of the opening 20 has a recess 26 formed therein adapted to bear upon the pointed end 16 of the shaft 14. The parts are so proportioned that the member 18 will be substantially balanced upon the pin 14. For the purpose of effecting such control of balance one end portion, preferably the short or left-hand end portion as viewed in Fig. 2, may be provided with an elongated slot 28, and a weight portion 30 held in place by a screw member 32 passing through the slot 28 will serve as means to counterbalance the arm structure.

The opposite or right-hand end of the arm structure 18, as viewed in Fig. 2, is preferably provided at its end with a socket portion 34, here illustrated as being formed by an elongated groove open at the end of the arm 18 and of a width adapted to receive the pickup cartridge 36 between side portions 38. The length and depth of the groove may be as selected. The cartridge 36 will include the usual stylus or needle 40 whose compliance is to be measured and which projects clear of the end of the arm 18 in the normal arrangement of the parts as illustrated in Fig. 2. The cartridge 36 will preferably be clamped in place by a plate member 42 carrying at one end a downwardly projecting fulcrum 44 and anchored to the plate 18 by a screw 46 interposed between the fulcrum 44 and the cartridge 36. The plate 42 is of a length sufficient to bear against and overlie the cartridge 36 and, as illustrated, is bifurcated at the cartridge contacting portion 48. This arrangement facilitates the rapid application and removal of successive cartridges or pickup units which are to be tested.

The base 10 mounts a vibration unit at the end thereof adjacent the pickup cartridge 36. This vibration unit is preferably housed within a casing 50 having suitable terminals 52 for electrical connection and having a projecting portion adapted to be engaged by the stylus 40.

The structure is best illustrated in Fig. 3. A pair of rigid members 54, preferably permanent magnets, are mounted upon the base 10 and clamp therebetween an elongated vibratory reed 56 of magnetic material and cantilever character and projecting substantially vertically so that its upper end is substantially free to vibrate. The upper end of the reed 56 preferably includes an integral substantially horizontal portion 58 against which the stylus is adapted to bear. The upper surface of the part 58 is grooved, pitted or otherwise roughened so that when the stylus bears thereon it will vibrate therewith and no free movement of the reed relative to the stylus will occur. Upon the base 54 is mounted an electromagnetic coil 60 having a central passage 62 therein through which the reed 56 projects freely and with clearance. The unit is preferably encased within an inverted substantially cup-shaped housing 64 of magnetic material and of any desired shape, such as the part-conical shape illustrated in Figs. 1 and 2, and in the top of this housing is provided a large opening 65 through which the reed 56 is adapted to pass with clearance. The operating circuit for the coil 60 is illustrated schematically at 68 and includes a variable oscillator 70. It will be apparent, therefore, that by means of this circuit the vibrating system may be energized to electromagnetically induce vibration of the reed 56 at any frequency selected. In this connection, the member 64 provides a path for magnetic flux from magnets 54. The flux due to operation of the electromagnet under control of the oscillator alternately aids and opposes that due to the magnets 54, and thereby vibrates the reed. When the reed is caused to oscillate without a load, that is when the reed operates without contact of the stylus 40 with the portion 58 thereof, the mechanical circuit shown in Fig. 4 exists. When, however, a lateral stiffness load, such as the stylus 40 of the pickup 36 is applied to the reed as shown in Figs. 1 to 3, the stiffness at the stylus point is added to the stiffness of the reed, and the reed vibrates with an amplitude different from its normal amplitude of vibration at the same frequency under no-load conditions. The mechanical circuit of the loaded reed is shown in Fig. 5.

For the purpose of measuring the difference in amplitude of vibration under loaded and no-load conditions, a voltage generator is employed in the system to generate a voltage in direct proportion to the amplitude of vibration. Such voltage generator may take any of a number of forms, for example, a wire coil positioned within a magnetic field and moved by the reed within that field, an armature on which is wound a pickup coil or a piezoelectric element mounted upon the reed. If piezoelectric elements are used they may be of the Rochelle salt or quartz crystal type or of the ceramic slab type, all of which are well known in the art. I have chosen for illustration herein, the use of a piezoelectric element 66 of the ceramic slab type which is cemented upon the reed 56 in such a manner that the vibration of the reed causes distortion of the slab and actuation thereof to generate a voltage. The voltage generator is connected in a measuring circuit, herein illustrated schematically at 72, and this circuit includes a voltmeter 74. The voltmeter 74 will be of the character which is susceptible of measuring the small voltages generated, and for this purpose will preferably be of the vacuum-tube type well known in the art.

In setting up the device for operation, the parts will be so balanced and proportioned by the location of the counterbalancing weight mass 30 that a small constant pressure will be applied by the arm to the pickup 36 and the stylus 40 to insure that the stylus 40 will be held in contact with the top surface of the part 58. The arm 18 should be rigid and should be massive enough to have a low tone arm resonance with cartridges having the lowest compliance to be measured.

In one embodiment of the invention a reed was selected having a resonance of 800 cycles per second with a compliance of $0.32 \times 10^{-6}$ centimeters per dyne. The no-load voltage output of the ceramic slab is set at 0.1 volt without producing appreciable non-linear distortion. In such an arrangement the response characteristics of compliance versus loaded voltage output of the ceramic slab when the no-load voltage is set at 0.1 volt is substantially linear.

It will be apparent that this device provides a means for simply, rapidly and expeditiously securing a direct reading of compliance when calibrated from the readings appearing upon the voltmeter. Such calibration may be made either upon the dial of the voltmeter or a direct reading of the voltmeter may be taken and translated into terms of compliance by means of a chart plotting compliance versus loaded voltage. The taking of successive readings of different elements whose compliance is to be measured is rendered simple, especially where those members are phonograph pickup cartridges as illustrated. In this connection it will be apparent that the clamp 42 may be quickly tightened and released and the cartridges 36 may be rapidly applied and withdrawn incident to each release of the clamp plate 42. It will be understood, of course, that where other elements than phonograph pickups are to be tested for compliance, changes must be made in the construction so as to accommodate the handling of such structures and particularly to accommodate a vibration transmitting relation between the vibrating reed and the vibratory member whose compliance is to be measured.

Thus it will be understood that changes in the construction may be made within the scope of the appended claims without departing from the spirit of the invention.

I claim:

1. A meter adapted to measure the compliance of an object, comprising a base, an upright member fixedly carried by said base, an arm substantially balanced upon the upper end of said member, means for securing said object to said arm in laterally spaced relation to said upright, a vibration unit carried by said base in predetermined relation to said upright member, said object having a part fixed to said arm and a relatively movable part whose compliance is to be measured, said unit including a vibratory member engaged by the part of said object whose compliance is to be measured and means for vibrating said member, a voltage generator associated with and actuated by said vibratory member, and means for measuring the electrical output of said generator said vibrating means operating at a frequency above the resonance frequency of the arm and the object and below the resonance frequency of the vibratory member.

2. A meter adapted to measure the compliance of an object, comprising a base, an upright member fixedly carried by said base, an arm substantially balanced upon the upper end of said member, means for securing said object to said arm in laterally spaced relation to said upright, a vibration unit carried by said base in predetermined relation to said upright member, said object having a part fixed to said arm and a relatively movable part whose compliance is to be measured, said unit including a vibratory member and means for vibrating said member at a frequency above the resonance frequency of the arm and the object and below the resonance frequency of the vibratory member, a voltage generator associated with and actuated by said vibratory member, and means for measuring the electrical output of said generator, said arm being elongated and positioned substantially horizontally with said object located above said vibration member and its compliant portion bearing upon the top of said vibratory member with a pressure dependent upon deviation of the arm from true balance.

3. A meter adapted to measure the compliance of an object having two relatively movable parts, comprising a base, an upright member fixedly carried by said base, an arm substantially balanced upon the upper end of said member, means for securing one part of said object to said arm, a vibration unit carried by said base in laterally spaced relation to said upright member and engaged by the part of the object whose compliance is to be measured, said unit including a vibratory member operating at a frequency below its resonance frequency and above the resonance frequency of the arm and the object, a voltage generator associated with and actuated by said vibratory member, and means for measuring the electrical output of said generator, said arm being elongated and positioned substantially horizontally, a balance weight, and means for securing said balance weight to said arm in selected adjustment to adjust the pressure of the engagement of said compliant object part upon said vibration unit.

4. A meter adapted to measure the compliance of an object having two relatively movable parts including a part whose compliance is to be measured, comprising a base, an upright member fixedly carried by said base, an arm substantially balanced upon the upper end of said member, means for securing one part of said object to said arm, a vibration unit carried by said base in laterally spaced relation to said upright member, said unit including a vibratory member pressed upon by the part of said object whose compliance is to be measured and means for vibrating said member at a frequency below its resonance frequency and above the resonance frequency of the arm and the object, a voltage generator associated with and actuated by said vibratory member, and means for measuring the electrical output of said generator, said arm including an upwardly projecting portion engaging said upright member whereby the center of gravity of said arm is located below the level of the upright-engaging portion of the arm.

References Cited in the file of this patent

UNITED STATES PATENTS

| Number | Name | Date |
|---|---|---|
| 2,156,592 | Knox | May 2, 1939 |
| 2,320,390 | Shmurak | June 1, 1943 |
| 2,355,194 | Wiggins | Aug. 8, 1944 |
| 2,384,716 | Wengel | Sept. 11, 1945 |
| 2,403,999 | Read et al. | July 16, 1946 |
| 2,496,632 | Lazan | Feb. 7, 1950 |
| 2,500,764 | Macgeorge | Mar. 14, 1950 |